United States Patent Office 3,253,037
Patented May 24, 1966

3,253,037
N-2-ALKYNYL-AMINO-BENZOCYLO-ALKANES
Charles Ferdinand Huebner, Chatham, N.J., assignor to Ciba Corporation, New York, N.Y., a corporation of Delaware
No Drawing. Filed Mar. 25, 1963, Ser. No. 267,810
The portion of the term of the patent subsequent to Aug. 17, 1982, has been disclaimed
6 Claims. (Cl. 260—577)

This is a continuation-in-part application of my application Serial No. 211,894, filed July 23, 1962, now abandoned, which in turn is a continuation-in-part application of my application Serial No. 203,436, filed June 19, 1962, now U.S. Patent No. 3,201,470.

The present invention concerns unsaturated amines. More especially, it relates to benzocycloalkane compounds, in which the cycloalkane portion has from five to seven ring members and is substituted by an N-alkynyl-amino group, in which the triple bond of the alkynyl portion is separated from the nitrogen atom by an alkylene radical, particularly to compounds of the formula

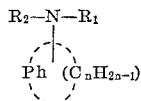

in which Ph stands for a 1,2-phenylene (o-phenylene) radical, the radical of the formula —$(C_nH_{2n-1})$— is an alkylene radical having from three to ten carbon atoms, whereby the alkylene portion between the 1-position and the 2-position of the 1,2-phenylene radical has from three to five carbon atoms, and is substituted by the group of the formula

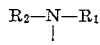

$R_1$ is an alkynyl group, in which the triple bond is separated from the nitrogen atom by an alkylene radical, and $R_2$ is hydrogen or, more especially, an organic radical, or salts thereof, as well as quaternary ammonium derivatives of those compounds, in which amino is a tertiary amino group, particularly of those compounds of the above formula, in which $R_2$ is an organic radical, thereof, and process for the preparation of such compounds.

The aromatic portion of the benzocycloalkane ring system, i.e. the 1,2-phenylene radical Ph, is unsubstituted (i.e. Ph stands for an unsubstituted 1,2-phenylene radical), or may be substituted (i.e. Ph is a substituted 1,2-phenylene radical). One or more than one of the same or of different substituents may be attached to any position available for substitution in the 1,2-phenylene radical; substituents are, for example, lower alkyl, e.g. methyl, ethyl, n-propyl, isopropyl, n-butyl and the like, trifluoromethyl, etherified hydroxyl, particularly lower alkoxy, e.g. methoxy, ethoxy, n-propyloxy, isopropyloxy, n-butyloxy and the like, as well as lower alkenyloxy, e.g. allyloxy, 2-methyl-allyloxy and the like, or lower alkylenedioxy, e.g. methylenedioxy and the like, or esterified hydroxyl, especially halogeno (representing hydroxyl esterified with a hydrohalic acid), e.g. fluoro, chloro, bromo and the like, as well as etherified mercapto, particularly lower alkylmercapto, e.g. methylmercapto, ethylmercapto and the like, nitro, amino, particularly N,N-di-lower alkyl-amino, e.g. N,N-dimethylamino, N-ethyl-N-methylamino, N,N-diethylamino and the like, N-acylamino, in which acyl is the acyl radical of an organic carboxylic acid, such as an aliphatic carboxylic acid, particularly lower alkanoic acid, e.g. acetic, propionic, pivalic acid and the like, or any other suitable organic carboxylic acid.

Substituted 1,2-phenylene groups representing Ph are, for example, (lower alkyl)1,2phenylene, e.g. (methyl)-1,2-phenylene (such as 3-methyl-1,2-phenylene, 4-methyl-1,2-phenylene, 4,5-dimethyl-1,2-phenylene and the like), (ethyl)-1,2-phenylene (such as 4-ethyl-1,2-phenylene and the like), (n-propyl)-1,2-phenylene (such as 4-n-propyl-1,2-phenylene and the like), (isopropyl)-1,2-phenylene (such as 3-isopropyl-1,2-phenylene and the like), or any other analogous (lower alkyl)-1,2-phenylene radical, (trifluoromethyl)-1,2-phenylene (such as 4-trifluoromethyl-1,2-phenylene and the like), (etherified hydroxy)-1,2-phenylene, especially (lower alkoxy)-1,2-phenylene, e.g. (methoxy)-1,2-phenylene (such as 3-methoxy-1,2-phenylene, 4-methoxy-1,2-phenylene, 4,5-dimethoxy-1,2-phenylene and the like), (ethoxy)-1,2-phenylene (such as 3-ethoxy-1,2-phenylene, 4-ethoxy-1,2-phenylene, 3,6-diethoxy-1,2-phenylene and the like), (n-propyloxy)-1,2-phenylene (such as 4-n-propyloxy-1,2-phenylene and the like), (isopropyloxy)-1,2-phenylene (such as 3-isopropyloxy-1,2-phenylene and the like), (n-butyloxy)-1,2,-phenylene (such as 4-n-butyloxy-1,2-phenylene and the like), or any other analogous (lower alkoxy)-1,2-phenylene radical, as well as (lower alkenyloxy)-1,2-phenylene, e.g. (allyloxy)-1,2-phenylene (such as 3-allyloxy-1,2-phenylene, 4-allyloxy-1,2-phenylene and the like), or any other analogous (lower alkenyloxy)-1,2-phenylene radical, (lower alkylenedioxy)-1,2-phenylene, e.g. (methylenedioxy)-1,2-phenylene (such as 4,5-methylenedioxy-1,2-phenylene and the like), or any other analogous (lower alkylenedioxy)-1,2-phenylene or (etherified hydroxy)-1,2-phenylene radical, (esterified hydroxy)-1,2-phenylene, especially (halogen) - 1,2-phenylene, e.g. (fluoro)-1,2-phenylene (such as 3-fluoro-1,2-phenylene, 4-fluoro-1,2-phenylene and the like), (chloro)-1,2-phenylene (such as 3-chloro-1,2-phenylene, 4-chloro-1,2-phenylene, 4,5-dichloro-1,2-phenylene, 3,6-dichloro-1,2-phenylene, 3,4,5,6-tetrachloro-1,2-phenylene and the like), (bromo)-1,2-phenylene (such as 4-bromo-1,2-phenylene, 3,6-dibromo-1,2-phenylene and the like), or any other analogous (halogeno)-1,2-phenylene or (esterified hydroxy)-1,2-phenylene radical, as well as (lower alkyl-mercapto)-1,2-phenylene, e.g. (methylmercapto)-1,2-phenylene (such as 4-methylmercapto-1,2-phenylene and the like), (ethyl-mercapto)-1,2-phenylene (such as 3-ethylmercapto-1,2-phenylene and the like), or any other analogous (lower alkyl-mercapto)-1,2-phenylene radical, (nitro)-1,2-phenylene (such as 3-nitro-1,2-phenylene, 4-nitro-1,2-phenylene and the like), (N,N-di-lower alkyl-amino)-1,2-phenylene, e.g. (N,N-dimethylamino)-1,2-phenylene (such as 3-N,N-dimethylamino-1,2-phenylene, 4-N,N-dimethylamino-1,2-phenylene and the like), (N-ethyl-N-methyl-amino)-1,2-phenylene (such as 4-N-ethyl-N-methyl-amino-1,2-phenylene and the like), (N,N-diethylamino)-1,2-phenylene (such as 4-N,N-diethyl-amino-1,2-phenylene and the like), or any other (N,N-di-lower alkyl-amino)-1,2-phenylene radical, (N-acyl-amino)-1,2-phenylene, such as (N-lower alkanoyl-amino)-1,2-phenylene, e.g. (N-acetylamino)-1,2-phenylene (such as 4-N-acetylamino-1,2-phenylene and the like), (N-pivalylamino)-1,2-phenylene (such as 4-N-pivalyl-amino-1,2-phenylene and the like), or any other analogus (N-acyl-amino)-1,2-phenylene radical, or any equivalent substituted 1,2-phenylene radical.

As indicated above, the cycloalkene ring of the benzocycloalkane ring system has from five to seven carbon atoms. In the above formula, the radical of the formula —$(C_nH_{2n-1})$—, has from three to ten carbon atoms (i.e., the letter n is an integer from 1 to 10), of which three to five separate the 1-position of the 1,2-phenylene radical from the 2-position, and is substituted by the group of the formula

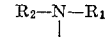

The compounds of this invention are, therefore, derivatives of the indane, the 1,2,3,4-tetrahydro-naphthalene and the benzosuberane series. The alkylene radical of the formula —$(C_nH_{2n-1})$— represents 1,3-propylene, 1,4-butylene, or 1,5-pentylene, and is substituted by the N-alkynyl-amino group. It may further represent branched alkylene radicals, e.g. 1-methyl-1,3-propylene, 1,1-dimethyl-1,3-propylene, 1,2-dimethyl-1,3-propylene, 2-ethyl-1,3-propylene, 1-isopropyl-1,3-propylene, 1-methyl-1,4-butylene, 1,1-dimethyl-1,4-butylene, 1,3-dimethyl-1,4-butylene, 4-tertiary butyl-1,4-butylene, 1,2,3-trimethyl-1,4-butylene, 1-methyl-1,5-pentylene, 3-n-propyl-1,5-pentylene and the like, which radicals are substituted by the N-alkynyl-amino group.

The N-alkynyl-amino group, in which the triple bond of the alkynyl portion is separated from the nitrogen atom by an alkylene radical, is advantageously the group of the previous formula

in which $R_1$ is an alkynyl group, in which the triple bond is separated from the nitrogen atom by an alkylene radical, and which has preferably from three to seven carbon atoms, and $R_2$ is hydrogen or, more especially, an organic radical.

An alkynyl group $R_1$ is particularly an alk-2-ynyl group, which has from three to five carbon atoms, such as a 2-propynyl group, especially 2-propynyl (or propargyl), as well as 1-methyl-2-propynyl, 1,1-dimethyl-propynyl, 3-methyl-propynyl (or 2-butynyl) and the like. Other alkynyl groups, having from three to seven carbon atoms, are, for example, 3-butynyl, 1,2-dimethyl-3-butynyl, 3-pentynyl, 3-hexynyl and the like.

The alkynyl substituent in the N-alkynyl-amino group may be the sole substituent of the amino-nitrogen atom (i.e. $R_2$ in the above formula is hydrogen). However, in addition to the alkynyl group, it is preferably substituted by an organic radical, more especially an aliphatic radical; the N-alkynyl-amino group is, therefore, above all an N-alkynyl-N-substituted-amino group (i.e. $R_2$ in the above formula stands for an organic substituent). An aliphatic radical representing such substituent, is above all lower alkyl having from one to seven carbon atoms, particularly methyl, as well as ethyl, n-propyl, isopropyl, n-butyl, secondary butyl, tertiary butyl, n-pentyl and the like. Other aliphatic radicals representing $R_2$ are, for example, lower alkenyl having from two to seven carbon atoms, e.g. allyl, 1-methyl-allyl, 2-methyl-allyl, 2-butenyl, and the like, lower alkynyl having from three to seven carbon atoms, such as one of the above mentioned alkynyl radicals. $R_2$ may also represent a cycloaliphatic radical, such as cycloalkyl having from three to eight, especially from five to seven, ring carbon atoms, e.g. cyclopropyl, cyclopentyl, cyclohexyl, cycloheptyl and the like, cycloalkenyl having from five to eight, especially from five to seven, ring carbon atoms, e.g. 2-cyclopentyl, 3-cyclopentyl, 2-cyclohexanyl, 3-cyclohexenyl, 2-cycloheptenyl and the like and a cycloaliphatic-aliphatic radical, such as cycloalkyl-lower alkyl, in which cycloalkyl has from three to eight, preferably from five to seven, ring carbon atoms, and lower alkyl has from one to seven carbon atoms, e.g. cyclopropylmethyl, 2-cyclopropylethyl, cyclopentylmethyl, 1-cyclopentylethyl, 2-cyclopentylethyl, cyclohexylmethyl, 2-cyclohexylethyl, cycloheptylmethyl and the like, or any other aliphatic, particularly substituted aliphatic radical, such as hydroxy-lower alkyl, e.g. 2-hydroxyethyl and the like, lower alkoxy-lower alkyl, e.g. 2-methoxy-ethyl, 2-ethoxy-ethyl and the like, or substituted cycloaliphatic radical. Other substituted aliphatic radicals representing $R_2$ are, for example, carbocyclic aryl-aliphatic radicals, such as phenyl-lower alkyl, e.g. benzyl, 1-phenylethyl, 2-phenylethyl and the like, or substituted phenyl-lower alkyl, in which phenyl is substituted by lower alkyl, e.g., methyl, ethyl, isopropyl and the like, lower alkoxy, e.g. methoxy, ethoxy and the like, halogeno, e.g. fluoro, chloro, bromo and the like, trifluoromethyl or any other substituents. Other organic radicals representing the additional substituent in an N-alkynyl-N-substituted amino group are, for example, carbocyclic aryl, such as phenyl or phenyl substituted by one of the above substituents, or any other suitable organic radical.

Salts of the compounds of this invention are particularly acid addition salts, such as the pharmaceutically acceptable, non-toxic addition salts with suitable acids, such as those with inorganic acids, e.g. hydrochloric, hydrobromic, nitric, sulfuric, phosphoric acids, or with organic acids, such as organic carboxylic acids, e.g. acetic, glycolic, maleic, hydroxymaleic, malic, tartaric, citric, salicylic, o-acetoxy-benzoic, nicotinic, isonicotinic acid and the like, or organic sulfonic acids, e.g. methane sulfonic, ethane sulfonic, 2-hydroxyethane sulfonic, p-toluene sulfonic, naphthalene 2-sulfonic acid and the like. Apart from pharmaceutically acceptable acid addition salts, other salts are also included within the scope of acid addition salts; they may serve as intermediates in the purification of the compounds or in the preparation of other, for example, pharmaceutically acceptable, acid addition salts, or are useful for identification and characterization. Acid addition salts, which are primarily used for identification purposes, are, for example, those with acidic organic nitro compounds, e.g. picric, picrolonic, flavianic acid and the like, or with metal complex acids, e.g. phosphotungstic, phosphomolybdic, chloro-platinic, Reinecke acid and the like.

Quaternary ammonium derivatives of those compounds of this invention in which the amino group is a tertiary amino group, are particularly those with reactive esters formed by hydroxylated compounds and strong acids, such as those with lower alkyl halides, e.g. methyl, ethyl, propyl or isopropyl chloride, bromide or iodide and the like, di-lower alkyl sufates, e.g. dimethyl sulfate, diethyl sulfate and the like, lower alkyl lower alkane sulfonates, e.g. methyl or ethyl methane sulfonate or ethane sulfonate and the like, lower alkyl monocyclic carboxylic aryl sulfonates, e.g. methyl p-toluene sulfonate and the like, phenyl-lower alkyl halides, e.g. benzyl, 1-phenylethyl or 2-phenylethyl chloride, bromide or iodide and the like, or any other suitable reactive ester compound. Also included as quaternary ammonium compounds are the quaternary ammonium hydroxides, and the quaternary ammonium compounds having as anions those of other inorganic or from organic acids, such as, for example, those of the other acids used for the preparation of the previously-mentioned acid addition salts.

The compounds of this invention have monoamine oxidase inhibiting properties of unusually prolonged duration. Pharmacological tests show, that animals pretreated with a compound of this invention, when given a catecholamine-releasing substance, i.e. a compound capable of releasing epinephrine or norepinephrine, such as, for example, reserpine or a reserpine analog, e.g. methyl 18-O-(2-tetrahydropyranyl)-reserpate and the like, show a marked increase in activity. This is due to the fact that the released catecholamines, i.e. epinephrine or norepinephrine, cannot be metabolized, because the compound of this invention used as the test substance inhibits the metabolizing effects of the monoamine oxidase. As compared with other known monoamine oxidase inhibiting compounds, the compounds of this invention are free from any central nervous system stimulating properties; furthermore they do not show any blood pressure raising effects. The compounds of this invention can, therefore, be used as stimulating agents in the treatment of fatigue, depression and the like.

A preferred group of compounds are those of the formula

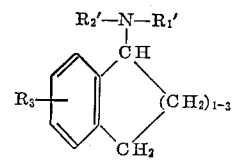

in which $R_1'$ is a 2-alkynyl radical having from three to five carbon atoms, $R_2'$ is lower alkyl having from one to four carbon atoms, especially methyl, and $R_3$ is hydrogen, lower alkyl having from one to four carbon atoms, halogeno having an atomic weight between 19 and 80, or trifluoromethyl, or the acid addition salts thereof. This group of compounds is represented, for example, by the compounds of the formulae:

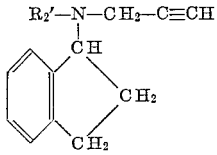

and

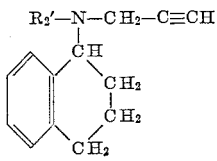

in which $R_2'$ has the previously given meaning, or the acid addition salts, particularly the pharmaceutically acceptable acid addition salts, thereof, especially by 1-N-methyl-N-propargylamino-indane and 1-N-methyl-N-propargyl-amino-1,2,3,4-tetrahydro-naphthalene or the acid addition salts, particularly the pharmaceutically acceptable acid addition salts, thereof.

The compounds of this invention may be used in the form of compositions for enteral or parenteral use, which contain the new compounds in admixture with an organic or inorganic, solid or liquid carrier. For making up these preparations there may be employed substances which do not react with the essential ingredient, such as water, gelatine, lactose, starches, stearic acid, magnesium sterate, talc, vegetable oils, benzyl alcohol, stearyl alcohol, gums, propylene glycol, polyalkylene glycols or any other known carrier for such compositions. The latter may be in solid form, for example, as capsules, tablets, dragees and the like, or in liquid form for example, as solutions, suspensions, emulsions and the like. If desired, they may contain auxiliary substances, such as preserving, stabilizing, wetting, emulsifying, coloring, flavoring agents and the like, salts for varying the osmotic pressure and buffers. They may also contain, in combination, other useful substances.

The compounds of this invention may be prepared according to known methods, for example by reacting a benzocyclo-alkane, in which the cycloalkane portion has as a substituent a reactive esterified hydroxyl group, particularly a compound of the formula

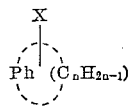

in which Ph has the previously given meaning, the radical of the formula $-(C_nH_{2n-1})-$ carrying the group X has the above given meaning, and X stands for a reactive esterified hydroxyl group, with an N-alkynyl-amine, in which the triple bond of the alkynyl portion is separated from the nitrogen atom by an alkylene radical, particularly with an amine of the formula $R_1-NH-R_2$, in which $R_1$ and $R_2$ have the previously given meaning, and, if desired, replacing in a monosubstituted N-alkynyl-amino group of a resulting compound the hydrogen attached to the amino-nitrogen by an organic radical, and/or, if desired, converting a resulting salt into the free compound or into another salt, and/or, if desired, converting a resulting compound into a salt or into a quaternary ammonium compound, and/or, if desired, converting a quaternary ammonim compound into another quaternary ammonium compound, and/or, if desired, converting a resulting mixture of isomers into the single isomers.

In the starting material of the above reaction, a reactive esterified hydroxyl group, e.g. the group X, is a hydroxyl group esterified with a strong inorganic acid, particularly a hydrohalic acid, e.g. hydrochloric, hydrobromic, hydriodic acid and the like, as well as a strong organic sulfonic acid, such as a carbocyclic aryl sulfonic acid, e.g. p-toluene sulfonic, 4-bromo-benzene sulfonic, 3-nitro-benzene sulfonic acid and the like, or an aliphatic sulfonic acid, e.g. methane sulfonic, 2-hydroxy-ethane sulfonic acid. The reactive esterified hydroxyl group, i.e. the group X in the above formula, is, therefore, above all halogeno having an atomic weight greater than 19, e.g. chloro, bromo and the like, as well as an organic sulfonyloxy group, e.g. p-toluene sulfonyloxy, 4-bromo-phenyl-sulfonyloxy, 3-nitro-phenyl-sulfonyloxy, methylsulfonyloxy, 2-hydroxyethylsulfonyloxy and the like. The treatment of the reactive ester compound with the amine is preferably carried out in the presence of an inert diluent, e.g. acetone, ethanol, p-dioxane, tetrahydrofuran and the like. The generated acid may be neutralized by using an excess of the amine or by carrying out the reaction in the presence of another base, e.g. sodium or potassium carbonate or hydrogen carbonate and the like. If necessary, the reaction is performed while cooling or at an elevated temperature, in a closed vessel and/or in the atmosphere of an inert gas, e.g. nitrogen.

The starting materials used in the above reaction are known or may be prepared according to known methods, for example, by reacting a benzocycloalkane compound, in which the cycloalkane portion is substituted by a hydroxyl group, with a reagent capable of converting such hydroxyl group into a reactive esterified hydroxyl group; suitable reagents are, for example, phosphorus halides, thionyl halides or organic sulfonic acid halides, e.g. chlorides and the like, the latter preferably used in the presence of a base, e.g. pyridine and the like.

As mentioned above, a hydrogen atom attached to the amino-nitrogen of a monosubstituted N-alkynyl-amino group in a resulting compound may be replaced by an organic radical; such organic radical is, for example, an aliphatic, a cycloaliphatic, a cycloaliphatic-aliphatic, a carbocyclic aryl-aliphatic radical and the like. Replacement of such hydrogen atom is carried out according to known methods, for example, by treatment with a reactive ester of an aliphatic, a cycloaliphatic, cycloaliphatic-aliphatic or carbocyclic aryl-aliphatic alcohol, particularly a corresponding halide, e.g. chloride, bromide, iodide and the like, or a corresponding sulfonyloxy compound, e.g. 4-methylphenyl-sulfonyloxy, 4-bromo-phenyl-sulfonyloxy, 3-nitro-phenyl-sulfonyloxy, methyl-sulfonyloxy, 2-hydroxyethyl-sulfonyloxy compound and the like; the reaction is performed according to the previously described conditions, if necessary, in the presence of a base. N-methylation may be carried out, for example, by treatment with a mixture of formic acid and formaldehyde.

Compounds of this invention, in which the cycloalkane portion carries an N-alkynyl-N-substituted amino group, i.e. compounds of the previously given formula, in which $R_2$ stands for an organic radical, may also be prepared by replacing in an N-monosubstituted-amino group attached to the cycloalkane portion of a benzocycloalkane compound, particularly in a compound of the formula

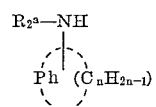

in which Ph has the above given meaning, the radical of the formula $-(C_nH_{2n-1})-$ carrying the group of the formula $R_2{}^a-NH$, has the previously given meaning, and $R_2{}^a$ stands for an organic radical, or a salt thereof, the hydrogen atom attached to the amino-nitrogen by an alkynyl group in such manner, that in the resulting compound the triple bond of the alkynyl portion is separated from the nitrogen atom by an alkylene radical, particularly by the group $R_1$ having the previously given meaning, and, if desired, converting a resulting salt into the free compound or into another salt, and/or, if desired, converting a resulting compound into a salt or into a quaternary ammonium compound, and/or, if desired, converting a quaternary ammonium compound into another quaternary ammonium compound, and/or, if desired, converting a resulting mixture of isomers into the single isomers.

The above reaction is carried out, for example, by treating the starting material with a reactive ester of an alkynol, in which the triple bond is separated from the reactive esterified hydroxyl group by an alkylene radical. Reactive esters of such alkynols are those with strong inorganic or organic acids, such as the acids mentioned before; they are above all alkynyl halides, e.g. chlorides, bromides and the like, in which the triple bond is separated from halogeno by an alkylene radical, and in which halogeno represents a hydroxyl group esterified with a hydrohalic acid. Especially useful are the alk-2-ynyl halides, which have from three to five carbon atoms, particularly 2-propynyl halides, as well as other lower alkynyl halides of the above type. Other reactive esters of alkynols are, for example, those with strong organic sulfonic acids, such as those previously mentioned.

The reaction of the amine with the reactive ester of an alkynol is preferably carried out in the presence of a suitable diluent, e.g. acetone, ethanol, p-dioxane, tetrahydrofuran and the like, and, if desired, of an additional base, for example, an inorganic base, such as an alkali metal carbonate, e.g. sodium or potassium carbonate or hydrogen carbonate and the like. If necessary, it may be performed while cooling or at an elevated temperature, in a closed vessel and/or in the atmosphere of an inert gas, e.g. nitrogen.

The starting materials used in the above reaction are known or may be prepared according to known methods, for example, by reacting a benzocycloalkane compound, in which the cycloalkane portion is substituted by a reactive esterified hydroxyl group, such as halogeno, e.g. chloro, bromo and the like, or organic sulfonyloxy, e.g. 4-methyl-phenyl-sulfonyloxy and the like, (such as one of the previously described compounds), with an N-monosubstituted amine, if desired, in the presence of a base, according to the method described before. Other starting materials may also be prepared, for example, by reacting a benzocyclo-alkanone compound with an N-monosubstituted amine and reduced the resulting Schiff-base derivative, for example, with sodium borohydride and the like, or those in which the α-carbon atom of the substituent in an N-monosubstituted amino group is an aliphatic carbon atom carrying at least one hydrogen atom, by reacting a benzocycloalkane compound, in which the cyclo-alkane portion is substituted by amino, with an acylating agent, such as, for example, an organic carboxylic acid halide, e.g. chloride and the like, or an organic acid anhydride, and converting in a resulting N-organic carbonyl-amino group (including a formylamino group, which may be formed by reacting the amino-compound with formic acid in the presence of acetic acid anhydride), the carbonyl group into a methylene group by reduction, for example, with lithium aluminum hydride and the like, or by any other suitable method.

Compounds in which the amino group is substituted by identical alkynyl groups may be prepared according to the above procedure, for example, a benzocycloalkane starting material, in which the cycloalkane portion is substituted by an N-monosubstituted amino group, the substituent being an alkynyl group in which the triple bond is separated from the nitrogen atom by an alkylene radical, i.e. especially a starting material of the above formula, in which $R_2^a$ is an alkynyl group, in which the triple bond is separated from the nitrogen atom by an alkylene group, may be formed as a non-isolated intermediate, when a benzocycloalkane compound containing in the cycloalkane portion an N-unsubstituted amino group, is reacted with a reactive ester of an alkynol, such as an alkynyl halide, e.g. bromide and the like.

The compounds of this invention may also be prepared, for example, by eliminating two moles of hydrogen halide from a benzocycloalkane having as a substituent of the cycloalkane portion an N-(di-halogenoalkyl)-amino substituent, in which the two halogeno atoms of the di-halogeno-alkyl portion occupy two neighboring carbon atoms separated from the nitrogen atom by an alkylene radical, particularly eliminating two moles of hydrogen halide from a compound of the formula

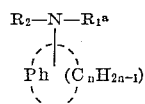

in which Ph and $R_2$ have the previously given meaning, the radical of the formula —$(C_nH_{2n-1})$— carrying the group of the formula

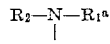

has the above given meaning, and $R_1^a$ is a dihalogenoalkyl radical, in which the two halogeno atoms occupy two neighboring carbon atoms separated from the nitrogen atom by an alkylene radical, and, if desired, carrying out the optional steps.

In the above starting material, the halogens occupying two neighboring carbon atoms in the N-(di-halogenoalkyl)-amino substituent, are above all bromine atoms, but may also be chlorine atoms and the like.

The removal of two moles of hydrogen halide from the starting material is carried out according to known methods; it is achieved, for example, by treatment of the starting material with a suitable base, for example, a metal alcoholate, such as an alkali metal lower alkoxide, e.g. potassium tertiary butoxide and the like. Preferably, the reaction is carried out in the presence of a diluent, such as an alcohol, e.g. tertiary butanol and the like, and at an elevated temperature, if necessary, in the atmosphere of an inert gas, e.g. nitrogen.

The starting material used in the above procedure may be prepared by treating a benzocycloalkane having as a substituent of the cycloalkane portion an N-alkenyl-amino group, in which the double bond of the alkenyl portion is separated from the nitrogen atom by an alkylene radical (and which may be prepared by any of the previously described methods for the corresponding compounds having an N-alkynyl amino substituent, using as the reagents an N-alkenyl-amine and a reactive ester of an alkenol, respectively), with at least two moles of a halogen, especially bromine, as well as chlorine and the like, preferably in the presence of a suitable diluent, e.g. glacial acetic acid and the like.

A resulting acid addition salt may be converted into the free compound according to known methods, for example, by treating it with a base, preferably in the presence of water, such as with a metal hydroxide, for example, an alkali metal or alkaline earth metal hydroxide, e.g. lithium hydroxide, sodium hydroxide, potassium hydroxide, calcium hydroxide and the like, a metal carbonate, such as an alkali metal or an alkaline earth metal carbonate or hydrogen carbonate, e.g. sodium, potassium or calcium carbonate or hydrogen carbonate and the like, ammonia and the like, or with a hydroxyl ion exchange preparation, or with any other suitable reagent.

A resulting acid addition salt may also be converted into another acid addition salt according to known methods; for example, a salt with an inorganic acid may be treated with a metal salt, e.g. sodium, barium, silver and the like, salt of an acid in a suitable diluent, in which a resulting inorganic salt is insoluble and is thus removed from the reaction medium. An acid addition salt may also be converted into another acid addition salt by treatment with an anion exchange preparation.

A free compound may be converted into an acid addition salt according to known methods, for example, by reacting the base, preferably a solution thereof in a solvent or solvent mixture, with the appropriate acid or a solution thereof, or with an anion exchange preparation and isolating the desired salt, which may be obtained in the form of a hydrate or may contain solvent of crystallization.

A compound of this invention having a tertiary amino group may be converted into a quaternary ammonium derivative, for example, by reacting it with a reactive ester formed by a hydroxylated compound and a strong acid. Reactive esters are primarily those yielding lower alkyl or phenyl-lower alkyl quaternary ammonium salts, such as halides, sulfates or sulfonates. The quaternizing reaction may be performed in the absence or presence of a suitable, inert solvent, while cooling, at room temperature or at an elevated temperature, under atmospheric or increased pressure, and/or in the atmosphere of an inert gas, e.g. nitrogen.

A resulting quaternary ammonium compound may be converted into another quaternary ammonium compound, such as a quaternary ammonium hydroxide, for example, by reacting a quaternary ammonium halide with a silver oxide or a quaternary ammonium sulfate with barium hydroxide, by treating a quaternary ammonium salt with an anion exchange preparation, by electrodialysis or any other suitable procedure. From a resulting quaternary ammonium hydroxide there may be prepared other quaternary ammonium salts with acids, such as those mentioned for the preparation of the acid addition salts, or with mono-lower alkyl sulfates, e.g. methyl sulfate, ethyl sulfate and the like. A quaternary ammonium compound may also be converted directly into another quaternary ammonium salt without the formation of the quaternary ammonium hydroxide; for example, a quaternary ammonium iodide may be reacted with freshly prepared silver chloride or with hydrochloric acid in anhydrous methanol to yield the corresponding quaternary ammonium chloride. A quaternary ammonium salt may also be converted into another quaternary ammonium salt by treatment with an anion exchange preparation. Quaternary ammonium derivatives may also be obtained in the form of the hydrates or may contain solvent of crystallization.

The new compounds of this invention may be obtained in the form of mixtures of isomers, which may be separated into the individual isomers according to known methods. Thus, racemates of compounds of this invention may be resolved into the optically active d- and l-forms according to known resolution procedures, for example, by reacting the free base of a d,l-compound, preferably a solution thereof, with one of the optically active forms of an acid containing an asymmetric carbon atom. Especially useful as optically active forms of salt-forming acids having an asymmetric carbon atom are D-tartaric acid (also known as l-tartaric acid) and L-tartaric acid (also known as d-tartaric acid); the optically active forms of malic, mandelic, camphor 10-sulfonic, quinic acid or any other suitable acid, may also be employed. From the reaction mixture, a salt can be isolated, which is formed by the optically active acid with one of the optically active forms of the base. The resulting salt may be converted into the free and optically active base or into another salt, and an optically active base may be converted into an acid addition salt or a quaternary ammonium compound; these reactions are carried out according to previously described known procedures. The optically active forms may also be isolated by biochemical methods.

The invention also comprises any modification of the process wherein a compound obatinable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a mixture of 2.16 g. of 1-(N-methyl-amino)-indane and 1.56 g. of sodium carbonate in 30 ml. of acetone is added dropwise 1.75 g. of propargyl bromide while stirring. The reaction mixture is then refluxed for four hours, cooled and filtered. The filtrate is concentrated to a small volume and treated with a solution of hydrogen chloride in ethanol. The desired 1-(N-methyl-N-propargyl-amino)-indane hydrochloride of the formula

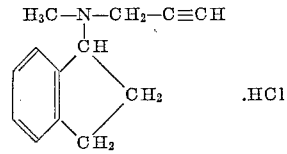

is precipitated by adding diethyl ether and is recrystallized from a mixture of ethanol and diethyl ether, M.P. 195–197°.

The starting material used in the above reaction may be prepared as follows: A mixture of 7.15 ml. of acetic acid anhydride and 3 ml. of formic acid is stirred on a water bath at 50–60° for two hours, then cooled to room temperature and, while stirring, treated dropwise with 7.0 g. of 1-amino-indane at such a rate that the temperature does not rise above 40°. Stirring is continued for an additional half-hour, and the reaction mixture is diluted with 20 ml. of diethyl ether. The diethyl ether layer is separated, washed twice with water, twice with a ten percent aqueous solution of sodium hydrogen carbonate, water, five percent hydrochloric acid and again with water, dried over magnesium sulfate and evaporated. The resulting crystalline 1-(N-formyl-amino)-indane melts at 92–95°; yield: 4.0 g.

To a suspension of 1.9 g. of lithium aluminum hydride in 30 ml. of tetrahydrofuran is added a solution of 4.0 g. of 1-(N-formyl-amino)-indane in tetrahydrofuran at a rate sufficient to maintain gentle reflux. Refluxing is then continued for five hours; the reaction mixture is allowed to stand overnight at room temperature, and is subsequently decomposed by adding with caution 2 ml. of water, 2 ml. of a twelve percent aqueous solution of sodium hydroxide and 8 ml. of water, and filtered. The filtrate is dried over magnesium sulfate and evaporated to dryness; the residue is distilled to yield the desired 1-(N-methyl-amino)-indane, B.P. 115–118°/18 mm.; yield: 2.16 g.

*Example 2*

To a mixture of 4.0 g. of 2-(N-methyl-amino)-indane and 2.88 g. of sodium carbonate in 50 ml. of acetone is added dropwise and while stirring 3.24 g. of propargyl bromide. The reaction mixture is then refluxed for four hours, cooled, and filtered; the filtrate is concentrated to a small volume and treated with an ethanol solution of hydrogen chloride. The 2-(N-methyl-N-propargyl-amino)-indane hydrochloride of the formula:

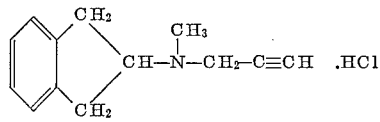

precipitates and is recrystallized from a mixture of ethanol and diethyl ether, M.P. 201–203°.

The starting material used in the above reaction is prepared according to the previously described procedure; the 2-(N-formyl-amino)-indane, B.P. 150°/0.3 mm., is converted by reduction with lithium aluminum hydride into the 2-(N-methyl-amino)-indane, the hydrochloride of which melts at 230–233°.

*Example 3*

To a mixture of 10.5 g. of 1-(N-methyl-amino)-1,2,3,4-tetrahydro-naphthalene and 6.9 g. of sodium carbonate in 120 ml. of acetone is added dropwise 7.8 g. of propargyl bromide while stirring. The reaction is carried out as described in Example 1; on evaporating the solvent, a small amount of a solid material precipitates, which is filtered off; the filtrate is evaporated, and the remaining oil is treated with an ethanol solution of hydrogen chloride. Upon dilution with diethyl ether, the desired 1-(N-methyl - N - propargyl - amino) - 1,2,3,4 - tetrahydro-naphthalene hydrochloride of the formula

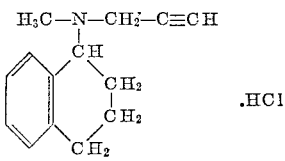

precipitates and is recrystallized from a mixture of isopropanol and diethyl ether, M.P. 168°.

The starting material is prepared as follows: A mixture of 27.6 g. of 1,2,3,4-tetrahydro-naphthalen-1-one, 19.75 g. of hydroxylamine hydrochloride and 150 ml. of pyridine in a minimum amount of water (about 50 ml.) and a sufficient quantity of ethanol to effect solution, is refluxed for 3½ hours and then poured into ice-water. The desired 1-oximino-1,2,3,4-tetrahydro-naphthalene is filtered off and recrystallized from ethanol, M.P. 93–95°; yield: 25 g.

A mixture of 12.5 g. of 1-oximino-1,2,3,4-tetrahydro-naphthalene and 5.8 g. of a palladium catalyst (10 percent palladium on charcoal) in 9.1 ml. of sulfuric acid and 171 ml. of acetic acid is treated with hydrogen under a pressure of about 3 atmospheres; the theoretical quantity of hydrogen is absorbed in less than 10 minutes during a mildly exothermic reaction. The catalyst is filtered off, the acetic acid is evaporated under reduced pressure and the residue is diluted with water. The aqueous mixture is made basic with an aqueous solution of ammonia, and the desired 1-amino-1,2,3,4-tetrahydro-naphthalene is extracted with diethyl ether; the organic solution is washed, dried and evaporated to yield 9 g. of the crude base. The hydrochloride of 1-amino-1,2,3,4-tetrahydro-naphthalene melts at 182–183°.

A mixture of 14.0 g. of 1-amino-1,2,3,4-tetrahydro-naphthalene, 13 ml. of acetic acid anhydride and 5.41 g. of formic acid is reacted according to the procedure described in Example 1 to yield 11.8 g. of 1-N-formyl-amino-1,2,3,4-tetrahydro-naphthalene, B.P. 161–163°/0.15 mm.; M.P. 74–76°. It is reduced by treatment with 5.14 g. of lithium aluminum hydride in 40 ml. of tetrahydrofuran as described in Example 1; the reaction mixture is diluted with 50 ml. of diethyl ether during the decomposition with 5 ml. of water, 5 ml. of 3 N aqueous sodium hydroxide and 20 ml. of water. The 1-(N-methyl-amino)-1,2,3,4-tetrahydro-naphthalene forms a crystalline maleate, M.P. 105°.

*Example 4*

To a mixture of 2.56 g. of 1-(N-methyl-amino)-benzosuberane and 1.55 g. of sodium carbonate in 20 ml. of acetone is added dropwise 1.75 g. of propargyl bromide while stirring. The reaction mixture is worked up as shown in Example 1 to yield the desired 1-(N-methyl-N-propargyl-amino)-benzosuberane hydrochloride of the formula

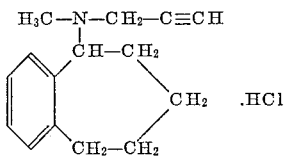

which melts at 168–170° after recrystallization from a mixture of ethanol and diethyl ether and contains a small amount of water of crystallization.

The starting material is prepared as follows: A mixture of 5.95 g. of 1-oximino-benzosuberane and 2.5 g. of a palladium catalyst (containing 10 percent palladium on charcoal) in 75 ml. of acetic acid and 4 ml. of sulfuric acid is treated with hydrogen under a pressure of about three atmospheres. The acetic acid is evaporated under reduced pressure, the residue is diluted with water, and the aqueous solution is made basic with ammonium hydroxide. The organic material is extracted with diethyl ether, the organic layer is separated, washed, dried and evaporated to yield the desired 1-amino-benzosuberane, which is used without further purification; its hydrochloride melts at 277–278° after recrystallization from a mixture of aqueous ethanol and diethyl ether.

The 1-(N-formyl-amino)-benzosuberane, M.P. 161–163°, is prepared by reacting 15.0 g. of the 1-amino-benzosuberane with 5.3 ml. of formic acid and 12.7 g. of acetic acid anhydride according to the procedure described in Example 1. It is converted into the 1-N-methylamino-benzosuberane by reacting a solution of 8.8 g. of 1-N-formyl-amino-benzosuberane with 3.54 g. of lithium aluminum hydride in 40 ml. of tetrahydrofuran, decomposing the reaction product by adding 3.5 ml. of water, 3.5 ml. of 12 percent aqueous sodium hydroxide and 14 ml. of water and diluting the mixture with 50 ml. of diethyl ether. The desired product is isolated by filtering off the inorganic material, evaporating the filtrate, and extracting the residue with ethanol; the ethanol soluble fraction yields the 1-(N-methyl-amino)-benzosuberane. Its hydrochloride melts at 180–182° after recrystallization from ethanol.

*Example 5*

A mixture of 8.0 g. of 1-(N-ethyl-amino)-indane and 5.27 g. of sodium carbonate in 100 ml. of acetone, when reacted with 5.92 g. of propargyl bromide according to the procedure described in Example 1, yields the 1-(N-ethyl-N-propargyl-amino)-indane of the formula

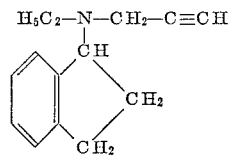

which is converted into its hydrochloride, which crystallizes after four days standing and is recrystallized from a mixture of ethanol and diethyl ether, M.P. 128–130°; ¼ mol of water of crystallization.

The starting material used in the above preparation is manufactured as follows: To a rapidly stirred mixture of 12.0 g. of 1-amino-indane and 40 ml. of ice is added 18.5 g. of acetic acid anhydride, followed by a 40 percent aqueous solution of potassium hydroxide until the reaction mixture is basic. After cooling, the desired 1-(N-acetyl-amino)-indane is filtered off and dried, M.P. 110–112°.

To a solution of 12.0 g. of 1-(N-acetyl-amino)-indane in 100 ml. of tetrahydrofuran is added 5.2 g. of lithium aluminum hydride in 45 ml. of tetrahydrofuran. The product is decomposed by adding 5.2 ml. of water, 5.2 ml. of a 12 percent aqueous solution of sodium hydroxide and 20.8 ml. of water, the inorganic material is filtered off and the filtrate is evaporated to yield the desired 1-(N-ethyl-amino)-indane; its hydrochloride melts at 214–216° after recrystallization from a mixture of ethanol and diethyl ether.

*Example 6*

To a mixture of 1.84 g. of 1-(N-methyl-amino)-indane hydrochloride and 2.12 g. of sodium carbonate in 20 ml. of acetone is added 1.19 g. of propargyl bromide; the reaction mixture is refluxed for 3½ hours while stirring and then cooled to room temperature. The inorganic solids are filtered off, the solvent is evaporated under reduced pressure, and the residue is dissolved in 20 ml. of methylene chloride. After filtration, the filtrate is saturated with hydrogen chloride, concentrated to about 10 ml., and then chilled overnight at 5°. The precipitate is collected, washed twice with cold methylene chloride, and dried at 60° under reduced pressure. The solid material (yield: 1.37 g.) is dissolved in about 6½ volumes of methanol and 10 volumes of ethyl acetate; the hot solution is filtered, and the filtrate is concentrated on the steam bath to about 7 volumes. After being chilled overnight at −5°, the crystalline 1-(N-methyl - N - propargyl-amino)-indane hydrochloride precipitates in prisms and is washed with cold ethyl acetate and dried at 60° under reduced pressure, M.P. 198–200°.

The starting material used in the above procedure is prepared as follows: To a glass autoclave liner is added 5.0 g. of crude 1-chloro-indane; after cooling with Dry Ice, 10 ml. of liquid methylamine is added, and the liner is placed into a pre-chilled autoclave. The reaction mixture is agitated for 16 hours while heating at 60°; after completion of the reaction, the excess of methylamine is allowed to evaporate at room temperature, and the residue is dissolved in aqueous hydrochloric acid. The solution is washed three times with 25 ml. of methylene chloride, made basic with a 50 percent aqueous solution of sodium hydroxide and extracted three times with 25 ml. portions of methylene chloride. The combined extracts are washed three times with 25 ml. portions of water, dried over anhydrous sodium, and treated with hydrogen chloride gas. The methylene chloride is removed under reduced pressure, and the residual oil is slurried with 10 ml. of acetone and chilled overnight at 5°. The 1-(N-methyl-amino)-indane hydrochloride is collected, washed twice with cold acetone and dried at 60° under reduced pressure, M.P. 148–150°; yield: 4.76 g.

*Example 7*

To a solution of 3.3 g. of 6-methyl-1-(N-methyl-amino)-indane in 35 ml. of acetone containing 2.17 g. of sodium carbonate is added dropwise 2.44 g. of propargyl bromide; the reaction mixture is treated as described in Example 1 to yield the 6-methyl-1-(N-methyl-N-propargyl-amino)-indane of the formula

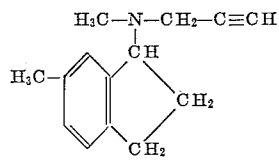

which is converted into its hydrochloride by treating it with a 10 N solution of hydrogen chloride in ethanol; the 6-methyl-1-(N-methyl-N-propargyl-amino)-indane hydrochloride melts at 212–214° after recrystallization from aqueous ethanol.

The starting material used in the above example is prepared as follows: A mixture of 50.0 g. of 4-methyl-cinnamic acid in 220 ml. of 90 percent ethanol and 1.0 g. of a palladium catalyst (10 percent palladium on charcoal) is hydrogenated at a pressure of about 3 atmospheres. After the absorption of the theoretical amount of hydrogen, the reaction is interrupted; the catalyst is filtered off; and the filtrate is evaporated. The γ-(4-methyl-phenyl)-propionic acid melts at 110–112° after recrystallization from ethanol.

To 500 g. of polyphosphoric acid, heated at 65–70°, is added, while stirring, 50.0 g. of γ-(4-methyl-phenyl)-propionic acid; the temperature is then raised to 80–90° for thirty-five minutes. The reaction mixture is poured onto ice; the aqueous mixture is extracted with diethyl ether, and the organic solution is washed with water, an aqueous solution of sodium hydroxide and again with water, and dried over sodium sulfate. Upon evaporating the solvent, the residue yields the 6-methyl-indane-1-one which melts at 53–56° after recrystallization from aqueous ethanol.

A mixture 21.0 g. of 6-methyl-indane-1-one, 120 ml. of pyridine and 15 g. of hydroxylamine hydrochloride dissolved in 50 percent ethanol is refluxed for 3½ hours, and then poured onto ice-water. The crystalline material is filtered off and recrystallized from ethanol to yield the 6-methyl-1-oximino-indane, M.P. 150–152°.

A mixture of 18.0 g. of 6-methyl-2-oximino-indane, 13 ml. of sulfuric acid, 250 ml. of acetic acid and 8.0 g. of a palladium catalyst (10 percent palladium on charcoal) is hydrogenated at a pressure of about 2.9 atmospheres. The catalyst is filtered off, the acetic acid of the filtrate is evaporated, and the residue is dissolved in water. The aqueous solution is made basic with ammonium hydroxide, and the desired 1-amino-6-methyl-indane is extracted with diethyl ether and isolated by washing the organic solution, drying it over magnesium sulfate and evaporating it. The 1-amino-6-methyl-indane hydrochloride melts at 262–263° after recrystallization from ethanol.

A mixture of 18.2 ml. of acetic acid anhydride and 7.8 ml. of formic acid is stirred at 50–60° for two hours and is then cooled; 20.0 g. of 1-amino-6-methyl-indane is added at such a rate that the temperature does not rise above 40°. The reaction mixture is stirred for an additional thirty minutes, then diluted with 50 ml. of diethyl ether, stirred at room temperature overnight, and again diluted with diethyl ether. After washing it twice with water, twice with an aqueous sodium hydrogen carbonate solution, with water, then five percent hydrochloric acid and again with water, and drying it over magnesium sulfate, the organic solvent is evaporated, and the residue is recrystallized from ethanol, to yield the 1-(N-formyl-amino)-6-methyl-indane, M.P. 108–110°.

To a suspension of 5.6 g. of lithium aluminum hydride in 50 ml. of tetrahydrofuran under an atmosphere of nitrogen is added a solution of 13.0 g. of 1-(N-formyl-amino)-6-methyl-indane in 225 ml. of tetrahydrofuran at the rate necessary to maintain gentle boiling. After refluxing for an additional four hours, the reaction mixture is allowed to stand at room temperature overnight, and is then diluted with 200 ml. of diethyl ether. The reaction product is decomposed by adding 5.5 ml. of water, 11 ml. of a 3 N aqueous solution of sodium hydroxide and 16.5 ml. of water. The organic layer is decanted, dried over magnesium sulfate and evaporated. The residue is distilled, and the desired 6-methyl-1-(N-methyl-amino)-indane is collected at 120–125°/17 mm.; its hydrochloride melts at 146–148° after recrystallization from ethanol.

*Example 8*

To a solution of 4.86 g. of 1-amino-indane in 75 ml. of acetone containing 4.32 g. of sodium carbonate, is added dropwise 4.86 g. of propargyl bromide while stirring. The reaction mixture is refluxed four hours, then cooled, filtered, and evaporated. The residue containing a small amount of a solid product is filtered, and the filtrate is distilled. The desired 1-(N,N-di-propargyl-amino)-indane of the formula

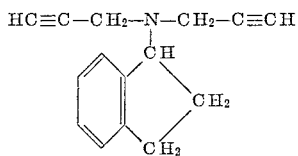

is collected at 161–165°/20 mm. and converted into its hydrochloride by treatment with 10 N ethanolic hydrogen chloride; the 1-(N,N-dipropargyl-amino)-indane hydrochloride melts at 160–163° after recrystallization from ethanol; yield: 1.0 g.

*Example 9*

A solution of 3.3 g. of 1-chloro-indane and 2.4 g. of propargyl-amine in 25 ml. of isopropanol is refluxed for six hours, then cooled and filtered to remove the solid propargyl-amine hydrochloride. The filtrate is evaporated, and the residue is treated with a 10 N ethanol solution of hydrogen chloride. The resulting 1-(N-propargyl-amino)-indane hydrochloride of the formula

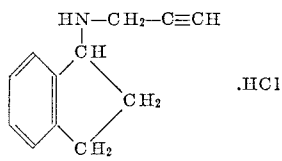

is recrystallized from ethanol, M.P. 178–179°; yield: 1.0 g.

*Example 10*

To a mixture of 18.5 g. of potassium tertiary butoxide in 50 ml. of tertiary butanol is added 20.0 g. of 1-[N-(2,3-dibromopropyl)-N-methyl-amino]-indane hydrochloride while stirring. The reaction mixture is refluxed for one hour; the tertiary butanol is then distilled off under reduced pressure, and the residue is diluted with water. The organic material is extracted with diethyl ether; the organic solution is dried and treated with a 6 N ethanol solution of hydrochloric acid. The desired 1-(N-methyl-N-propargyl-amino)-indane hydrochloride crystallizes and is recrystallized from ethanol. The compound is identical with the product obtained according to the procedure described in Example 1.

The starting material used in the above reaction is prepared as follows: To a solution of 3.0 g. of 1-(N-methyl-amino)-indane in 40 ml. of acetone containing 2.16 g. of sodium carbonate is added dropwise while stirring 2.42 g. of allyl bromide. The reaction mixture is refluxed for four hours; the sodium bromide is then filtered off, and the filtrate is evaporated. The residual oil is dissolved in water; the aqueous solution is made basic with ammonium hydroxide and is extracted with diethyl ether. The organic phase is washed, dried over magnesium sulfate and evaporated. The residue is treated with a 10 N ethanol solution of hydrogen chloride, and the gummy solid is crystallized from a mixture of aqueous ethanol and diethyl ether to yield the 1-(N-allyl-N-methyl-amino)-indane hydrochloride, M.P. 139–141°.

To a suspension of 1-(N-allyl-N-methyl-amino)-indane hydrochloride in acetic acid is added while stirring 9 ml. of a 5 molar solution of bromide in acetic acid. After completion of the addition, the reaction mixture is diluted with 100 ml. of diethyl ether, whereupon the desired 1-[N-(2,3 - dibromo - propyl) - N - methyl - amino] - indane hydrochloride precipitates and is used without further purification.

*Example 11*

To a stirred mixture of 10.0 g. of 1-amino-indane, 9.5 g. of sodium carbonate and 1.0 g. of copper bronze in acetone is added 9.25 g. of α,α-dimethyl-propargyl chloride. The mixture is stirred at room temperature for 2½ days, and is then filtered; the filtrate is evaporated to dryness under reduced pressure to yield the 1-[N-(α,α-dimethyl-propargyl)-amino]-indane of the formula

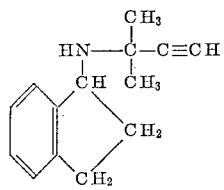

which is converted into its hydrochloride by treating the oily base with an ethanol solution of hydrogen chloride; the 1-[N-(a,a-dimethyl-propargyl)-amino]-indane hydrochloride melts at 239–240° after recrystallization from ethanol; yield: 7.0 g.

Other compounds prepared according to the previously described methods by selecting the appropriate starting materials, are, for example, 1-N-(2-butynyl)-N-methyl-amino-indane,
1-N-isopropyl-N-propargyl-amino-indane,
3-methyl-1-N-methyl-N-propargyl-amino-indane,
5-chloro-1-N-methyl-N-propargyl-amino-indane,
6-chloro-1-N-methyl-N-propargyl-amino-indane,
5,6-dichloro-1-N-methyl-N-propargyl-amino-indane,
5-methyl-1-N-methyl-N-propargyl-amino-indane,
1-N-methyl-N-propargyl-amino-5-trifluoro-methyl-indane,
1-N-isopropyl-N-propargyl-amino-1,2,3,4-tetrahydro-naphthalene,
2-N-methyl-N-propargyl-amino-1,2,3,4-tetrahydro-naphthalene,
6-chloro-1-N-methyl-N-propargyl-amino-1,2,3,4-tetra-hydro-naphthalene,
7-chloro-1-N-methyl-N-propargyl-amino-1,2,3,4-tetra-hydro-naphthalene,
1-N-ethyl-N-propargyl-1,2,3,4-tetrahydro-naphthalene,
1-N-(2-butynyl)-N-methyl-amino-1,2,3,4-tetrahydro-naphthalene,
1-N-propargyl-N-propyl-amino-benzosuberane and the like,
or the acid addition salts of such compounds.

*Example 12*

A mixture of 1.39 g. of 97 percent formic acid and 0.88 g. of paraformaldehyde is heated to 60°, and 3.88 g. of 1-[N-(a,a-dimethyl-propargyl)-amino]-indane is added. The temperature is maintained at 60° for twenty hours; the reaction mixture is then cooled and evaporated to dryness. The residue is taken up in a small amount of water, the mixture is made basic with an aqueous solution of sodium hydroxide, and the organic material is extracted with diethyl ether. The organic solution is washed, dried and evaporated to yield the 1-[N-(a,a-dimethyl-propargyl)-N-methyl-amino]-indane of the formula

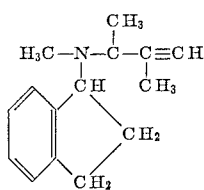

which is converted into its hydrochloride by treating it with ethanolic hydrogen chloride. The 1-[N-(α,α-dimethyl-propargyl) - N - methyl - amino] - indane hydrochloride melts at 135–137° after recrystallization from a mixture of ethanol and diethyl ether.

Also included within the scope of this invention are compositions consisting essentially of a pharmacologically effective amount of a benzocycloalkane compound, in which the cycloalkane portion has from five to seven ring members and is substituted by an N-alkynyl-amino group, in which the triple bond of the alkynyl portion is separated from the nitrogen atom by an alkylene radical, particularly of a compound of the formula

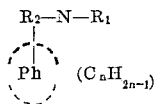

in which Ph, $R_1$, $R_2$ and the group of the formula —$(C_nH_{2n-1})$— have the previously given meaning, or a salt thereof, or a quaternary ammonium compound of such compounds in which amino is a tertiary amino group. These compositions are represented by those consisting essentially of a pharmacologically effective amount of a compound of the formula

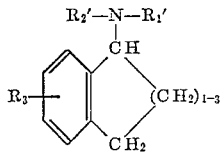

in which $R_1'$, $R_2'$ and $R_3$ have the previously given meaning, particularly those consisting essentially of a pharmacologically effective amount of a compound having one of the following formulae

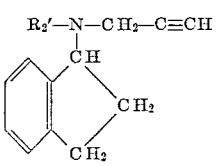

and

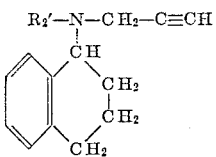

in which $R_2'$ has the previously given meaning, or the acid addition salts of these compounds.

The compositions are prepared by combining the active ingredient with a major amount of a pharmaceutically acceptable organic or inorganic carrier. The compositions of this invention may be made up to contain from about 1 percent to about 40 percent, preferably from about 5 percent to about 40 percent, by weight, of the active ingredient.

Tablets, capsules, dragees and the like represent the preferred oral form of administration. These orally applicable composiitons may be compounded to have per single dosage unit from about 0.0025 g. to about 0.025 g., of the active ingredient, which is preferably used in the form of its pharmaceutically acceptable, non-toxic acid addition salt, such as one of the above-mentioned salts with an inorganic or organic acid, e.g. hydrochloric, sulfuric, phosphoric, tartaric, maleic, citric, methane sulfonic, p-toluene sulfonic, naphthalene 2-sulfonic acid and the like.

Apart from the active compound, the orally applicable preparations may contain carrier substances commonly employed in the pharmaceutical art of preparing dosage unit compositions, including excipients, binders, fillers, stabilizers or any other ingredients; examples of such carrier materials have been described above. The quantities of these materials may vary widely and depend, to a certain degree, upon the desired physical appearance (hardness and the like), size of the composition and the like. Encapsulation may also be effected using, if desired, the same excipients as those used for tablets. The compounding of the formulations is generally carried out in the manner normally employed in the art. Any compatible color, approved and certified under the provisions of the Federal Food, Drug and Cosmetic Law may be used for aesthetic purposes or as a means of identification.

Parenteral solutions represent other pharmaceutical preparations containing from about 1 percent to about 40 percent, of the active ingredient. In view of the fact that the active ingredient in the form of its non-toxic acid addition salt is a water-soluble substance, parenteral solutions contain water (purified for the use in parenteral solutions) as the primary solvent; other ingredients, particularly stabilizers, such as, for example, anti-oxidants, e.g. thiourea, sodium sulfide, sodium metabisulfite, abscorbic acid, cysteine hydrochloride, sodium formaldehyde sulfoxylate and the like, mono-thioglycerol, thiosorbitol and the like, buffer combinations, such as, for example, acetic acid: sodium acetate, potassium phthalate: sodium hydroxide, potassium dihydrogen phosphate: sodium hydroxide and the like, salts for making isotonic solutions, e.g. sodium chloride and the like, are added to ensure stable solutions suitable for injection. It is desirable to maintain a pH of about 7, and any buffers yielding such pH may be utilized.

*Example 13*

Tablets, each containing 0.015 g. of 1-(N-methyl-N-propargyl-amino)-indane hydrochloride, may be prepared as follows (for 10,000 tablets).

| Ingredients: | G. |
|---|---|
| 1-(N-methyl-N-propargyl-amino)-indane hyhydrochloride | 150.0 |
| Lactose, spray dried | 1,260.0 |
| Corn starch | 75.0 |
| Stearic acid | 15.0 |

The 1-(N-methyl-N-propargyl-amino)-indane hydrochloride is passed through a No. 60 screen, and the lactose, the corn starch and the stearic acid through a No. 30 screen. The ingredients are mixed in a mixer and then compressed into tablets, weighing 0.15 g., using 9/32 inch standard concave punches.

*Example 14*

An injectable solution containing 0.005 g. of 1-(N-methyl-N-propargyl-amino)-indane hydrochloride per one ml. of solution may be prepared as follows (for 1000 ml.).

| Ingredients: | G. |
|---|---|
| 1-(N-methyl-N-propargyl-amino)-indane hydrochloride | 5.0 |
| Sodium chloride | 6.0 |
| Water for injection, q.s., 1,000 ml. | |

The 1-(N-methyl-N-propargyl-amino)-indane hydrochloride and the sodium chloride are dissolved in 900 ml. of water for injection. The solution is then brought to a total volume of 1000 ml., filtered through a medium porosity sintered glass filter and filled in 1.1 ml. portions into one ml. ampules. The latter are sealed, sterilized at 110° for thirty minutes and inspected.

What is claimed is:
1. A compound of the formula

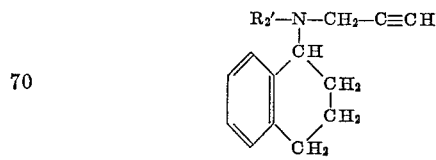

in which $R_2'$ is lower alkyl.

2. An acid addition salt of a compound of the formula

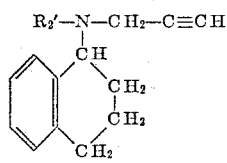

in which $R_2'$ is lower alkyl.

3. 1 - N - methyl - N - propargyl - amino - 1,2,3,4-tetrahydronaphthalene.

4. 1-(N-propargyl-amino)-indane.

5. 6 - methyl - 1 - (N - methyl - N - propargyl - amino)-indane.

6. 1-[N-($\alpha,\alpha$-dimethyl-propargyl)-amino]-indane.

References Cited by the Examiner
UNITED STATES PATENTS
3,201,470   8/1965   Huebner _____ 260—577

CHARLES B. PARKER, *Primary Examiner.*

JOSEPH P. BRUST, *Examiner.*

DALE R. MAHANAND, ROBERT V. HINES,
*Assistant Examiners.*